Nov. 17, 1959  R. C. ZELLER  2,912,838
UNIVERSAL JOINT

Filed Sept. 16, 1957  2 Sheets-Sheet 1

INVENTOR.
ROBERT C. ZELLER
BY
*Whittemore Hulbert & Belknap*
ATTORNEYS

Nov. 17, 1959 R. C. ZELLER 2,912,838
UNIVERSAL JOINT
Filed Sept. 16, 1957 2 Sheets-Sheet 2

INVENTOR.
ROBERT C. ZELLER
BY
Whittemore Hulbert & Belknap
ATTORNEYS

United States Patent Office 2,912,838
Patented Nov. 17, 1959

2,912,838

UNIVERSAL JOINT

Robert C. Zeller, Defiance, Ohio, assignor to The Zeller Corporation, Defiance, Ohio, a corporation of Ohio Application September 16, 1957, Serial No. 684,160

4 Claims. (Cl. 64—17)

The invention relates to universal joint and forms a continuation-in-part of my pending application for patent, Serial No. 649,945, filed April 1, 1957.

The type of universal joint to which my invention applies is one comprising bifurcated rotary head members, a trunnioned cross connecting member and bushings insertable in enlarged apertures in the furcations of said head members forming bearings for the respective trunnions. The purpose of using these bushing bearings is that they may be of the roller type and also permit of the assembly of the trunnioned member with the bifurcated head members before said bushings are engaged therewith. However, this necessitates some means of interlocking the bushings with their respective furcations.

It is the object of the invention to provide a simple means for effecting this interlocking and also one which permits of disengagement whenever it is desired to disassemble the members of the joint. To this end the invention consists in the construction as hereinafter set forth.

Figure 1:
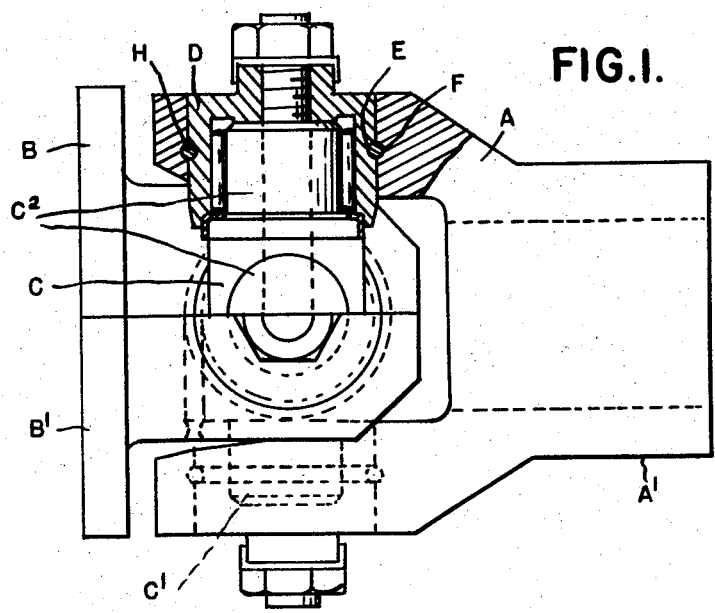
Fig. 1 is a side elevation of the universal joint partly in section.
Figure 2:
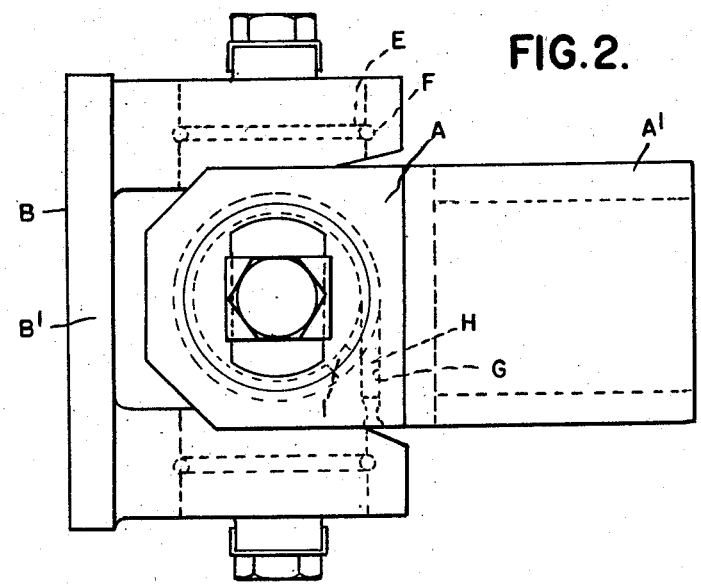
Fig. 2 is a similar view viewed at right angles to Fig. 1.
Figure 3:
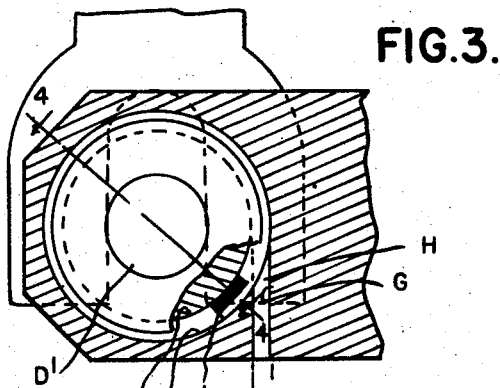
Fig. 3 is a cross section on line 3—3 of Fig. 4.
Figure 4:
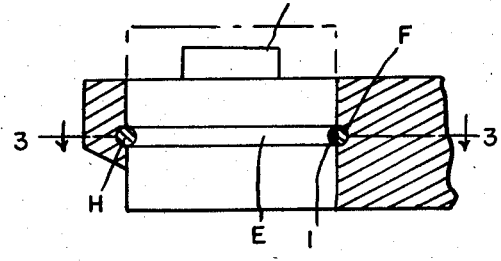
Fig. 4 is a section on line 4—4 of Fig. 3.
Figure 5:
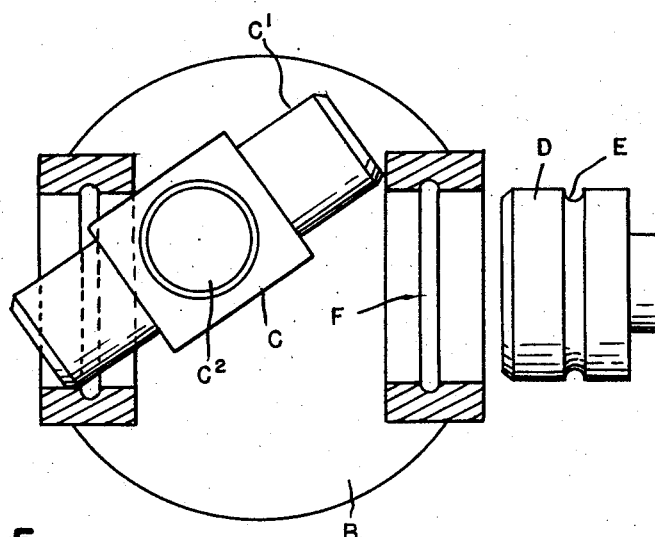
Fig. 5 is a sectional elevation illustrating the manner of assembling the cross trunnioned member with a bifurcated head member.

A and B are the respective bifurcated head members of the universal joint and C is a cross trunnioned connecting member therefor. As specifically shown the member A has a hub portion A' for engaging a shaft (not shown) and the member B has a plate B'. However, any other suitable means for connecting these associated parts may be substituted therefor. The pairs of trunnions C' and C² of the member C have their axes perpendicular to each other in a common plane and are axially extended to a dimension greater than the space between the furcations of the member engaged therewith.

This necessitates the forming of enlarged apertures in each of the furcations which permits of an angular arrangement of the axis of the aligned trunnions to the pivot axis in the furcation with which it is to be engaged in order to clear the opposite furcation. However, the enlargement of the aperture in the furcation is sufficient to provide clearance for such angular engagement. Bushing bearings D, preferably roller bearings having cupped outer race members with rolls therein are then inserted from the outside into each furcation to engage the trunnion therein.

It is essential that these bushing bearings should be rigidly locked in position while the universal joint is in use but to permit disassembly of the parts when necessary, said bushings must be removable. I have therefore provided locking means of the following construction:

E and F are complementary registering annular grooves preferably of semi-circular cross section and respectively externally of the bushings and internally of the furcations. Each furcation is also provided with an entrance channel G from one side thereof which extends into tangent relation with the grooves E and F. H is a rod of a cross section corresponding to that of G and the complementary grooves E and F. This rod is inserted through the channel G and is forced inward to be conformed to the curvature of the grooves E and F, forming a locking key therebetween. The remainder of the rod may be cut off and the insert retained by upsetting the metal at the outer end of the channel G. Such a construction would rigidly secure the bushing D from displacement but if at any time it was desired to disassemble the parts it would be difficult to withdraw the rod. Such difficulty I have avoided by placing within the groove E a stop I which is rigidly secured therein by suitable means, such as welding. During insertion of the rod H the stop I will rotate the bushing within the furcation until said stop contacts with the tangent portion of the rod, after which the rod is cut off. To remove the insert it is only necessary to revolve the bushing D in the opposite direction, whereupon the stop I will force the rod to travel therewith and force it outward through the channel G. The bushing D may be provided with a polygonal portion D' or other means for rotating the same.

The construction as above described may be manufactured at low cost and forms a rigid locking means between each bushing and its corresponding furcation. However, as just described it can be readily unlocked and the bushing removed.

What I claim as my invention is:

1. In a universal joint of the type comprising bifurcated rotary head members with enlarged apertures in the furcations thereof, a trunnioned cross connecting member, the trunnions thereof having respectively clearance within said apertures for angular engagement therewith and a bushing bearing insertable in each furcation for pivotal engagement with the trunnion therein and forming a bearing therefor; means for locking each bushing within its furcation comprising complementary registering annular grooves in the meeting faces thereof, an entrance channel in the otherwise solid portion of the furcation equal in cross section and the same in contour as the complementary cross sections of said grooves and longitudinally tangent thereto, and a rod of corresponding cross section insertable through said channel and around said grooves to be conformed to the latter and to form a key connection therebetween.

2. The construction as in claim 1 having a stop for said rod rigid with said bushing at one point in the grove thereof whereby reverse rotation of said bushing will expel said rod through said channel.

3. The construction as in claim 1 in which the cross sections of said rod and of said entrance channel are circular and that of said grooves correspondingly semi-circular.

4. The construction as in claim 1 in which said rod is wholly within said furcation and the latter is deformed at the outer rod end of said entrance channel to prevent accidental displacement of said rod.

References Cited in the file of this patent

UNITED STATES PATENTS

| 1,464,386 | Ingram | Aug. 7, 1923 |
| 2,397,585 | Anderson | Apr. 2, 1946 |
| 2,458,714 | Mahoney | Jan. 11, 1949 |